United States Patent Office 3,206,245
Patented Sept. 14, 1965

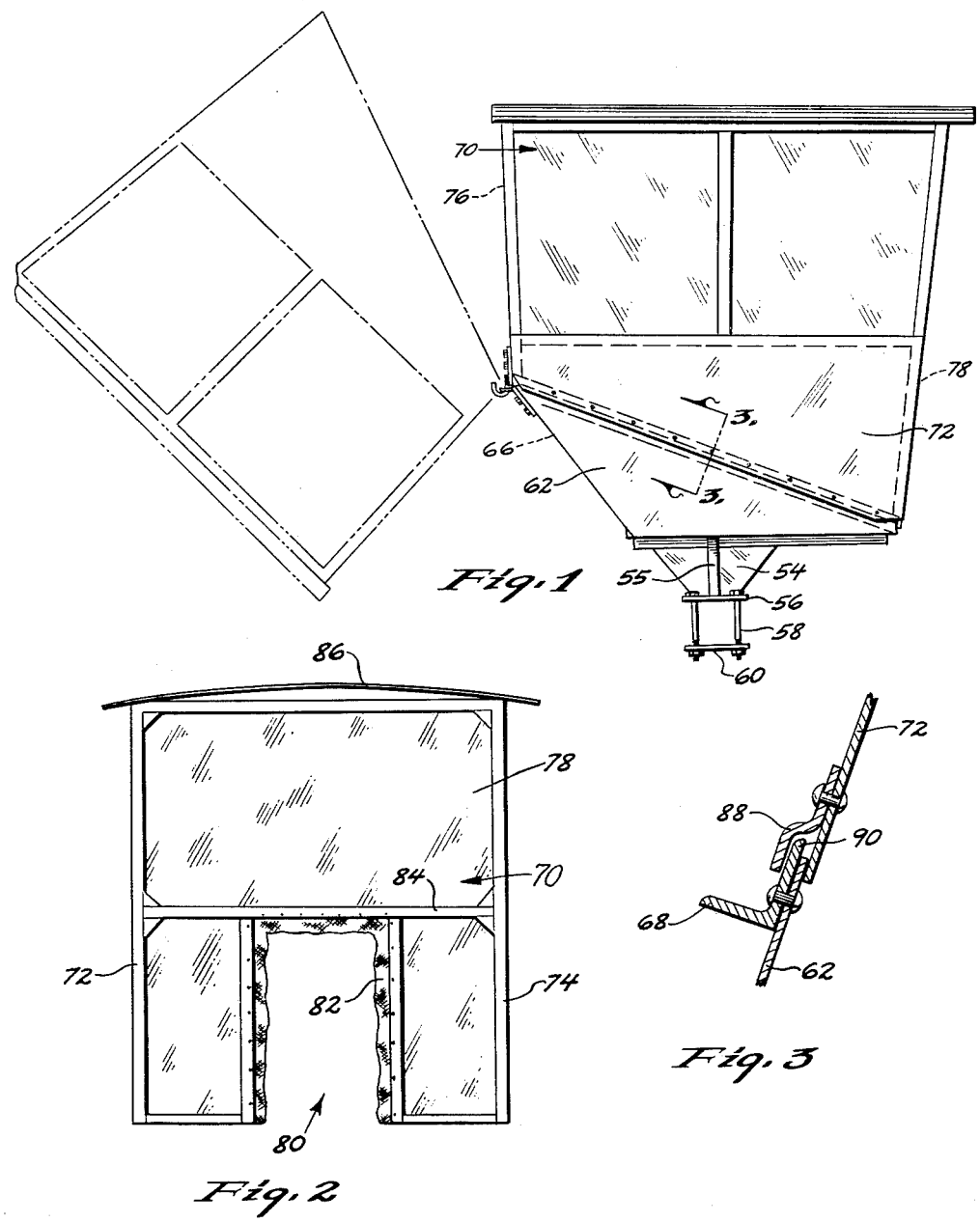

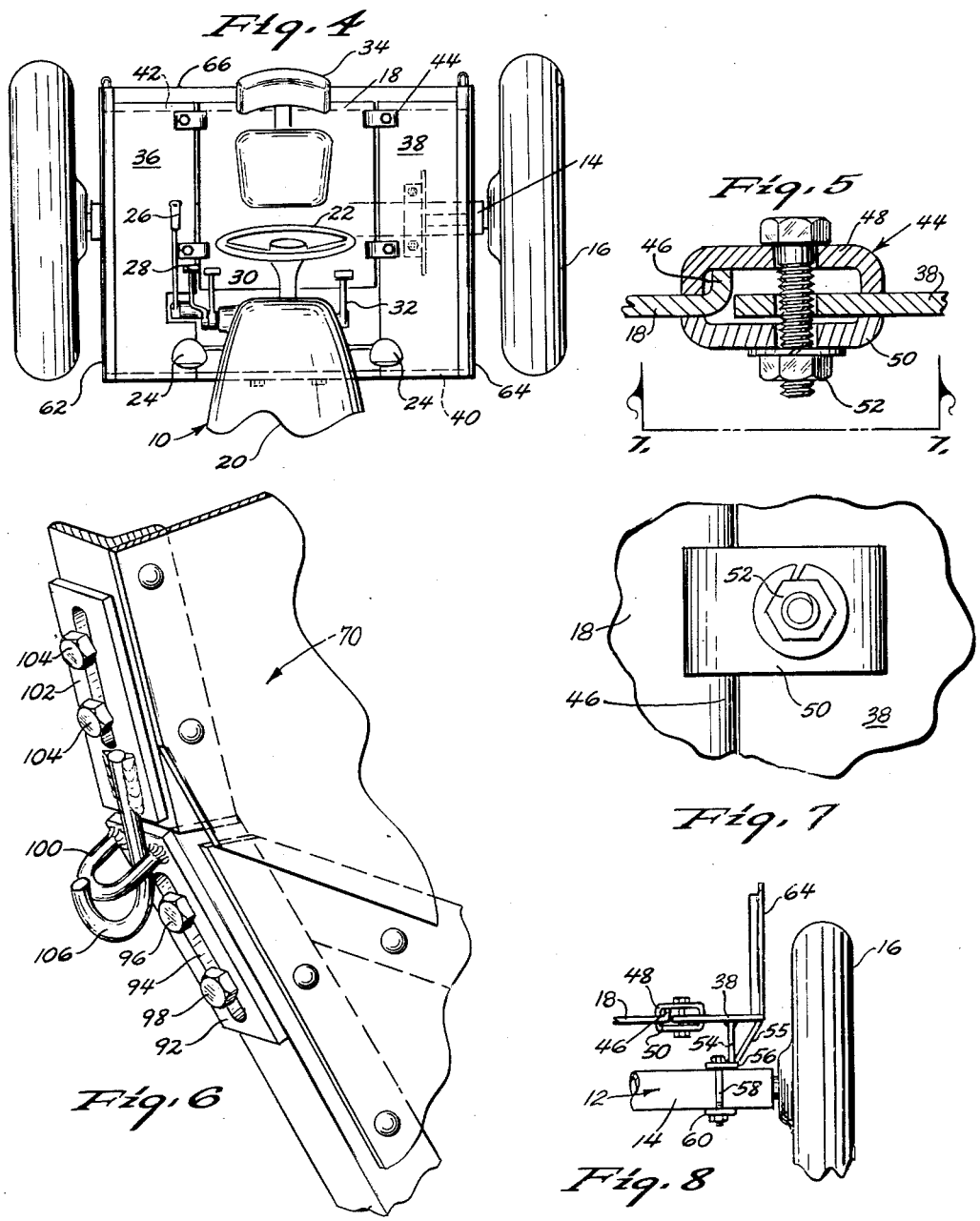

1

3,206,245
DETACHABLE TRACTOR CAB
Marvin L. Westrum and Dalton M. Westrum, Stratford, Iowa, assignors to WGW Engineering, Inc., Stratford, Iowa, a corporation of Iowa
Filed Mar. 25, 1963, Ser. No. 267,489
5 Claims. (Cl. 296—102)

The presence of a cab on a tractor is highly desirable at times, but the cab must occasionally be removed from the tractor to permit certain operational functions thereof. Our invention relates to such a cab, and one of the principal objects of our invention is to provide a cab which can be easily and quickly mounted on and detached from a tractor.

A further object of our invention is to provide a detachable tractor cab which is pivotally mounted on the rear of the tractor, and which can be easily pivoted during the mounting and dismounting operations without interfering with the permanent structure of the tractor.

A still further object of our invention is to provide a detachable tractor cab which can be easily accommodated to tractors of different sizes.

A still further object of our invention is to provide a detachable tractor cab which will enlarge on the normal platform area of the tractor.

A still further object of our invention is to provide a detachable tractor cab which will be water-tight and relatively dust-proof.

A still further object of our invention is to provide a detachable tractor cab that will deflect reflective light from the cab into the ground.

A still further object of our invention is to provide a detachable tractor cab which is pivotally secured to the tractor and which can have its pivotal axis selectively positioned and adjusted.

A still further object of our invention is to provide a detachable tractor cab which will not obstruct the tractor operator's view.

Still further objects of our invention are to provide a detachable tractor cab that is economical in manufacture, durable in use, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawing, in which:

FIGURE 1 is a side elevational view of our device in mounted condition on a tractor. The dotted lines of this figure show the cab in a pivoted position with respect to the tractor. The tractor itself has not been shown in this figure;

FIGURE 2 is a frontal elevation of our device;

FIGURE 3 is a partial sectional view of our device taken on line 3—3 of FIGURE 1. The components of FIGURE 3 are actually vertically disposed but are shown to be slightly inclined as they are a projection of the inclined axis of line 3—3;

FIGURE 4 is a plan view of the tractor platform and auxiliary platform;

FIGURE 5 is an enlarged scale sectional view of the

2 clamp structure that helps to secure the tractor platform to the auxiliary platform.

FIGURE 6 is an enlarged scale perspective view of one of the hinge elements of our device;

FIGURE 7 is a bottom plan view of the clamp shown in FIGURE 5 as viewed on line 7—7; and FIGURE 8 is a partial front elevational view of our device showing how the auxiliary frame is secured to the tractor.

We have used the numeral 10 to generally designate a conventional farm tractor. Tractor 10 has the conventional components of all tractors, including frame 12, rear axle 14, rear wheels 16, platform 18, cowling 20, steering wheel 22, headlights 24, control elements 26, 28, 30 and 32, and seat element 34. Spaced apart rectangular auxiliary platforms 36 and 38 have their forward ends rigidly secured to angle 40 by any convenient means and their rearward ends are similarly connected by angle 42.

Angle 40 extends either under or through cowling 20. A plurality of clamps 44 interconnect the tractor platform 18 and the auxiliary platforms 36 and 38. Such a clamp is illustrated in FIGURES 4, 5, 7 and 8. An upwardly extending bead 46 is formed on the side edges of tractor platform 18. Oppositely disposed U-shaped clam elements 48 and 50 engage the upper and lower surfaces of the tractor and auxiliary platforms. Nut and bolt assemblies 52 extend through registering apertures in the auxiliary platforms and the clamp elements to cause the clamp elements to lock and bind the tractor platform to the auxiliary platform there involved.

A vertical bracket 54 is welded to and extends downwardly from the bottom of each of the auxiliary platforms 36 and 38. Diagonal braces 55 are welded into position as shown to reinforce brackets 54. A flat, horizontally disposed bar 56 is welded to the lower edge of each bracket 54. A pair of nut and bolt assemblies 58 extend downwardly through bar 56 to support bar 60 which is identical to bar 56. The bars 56 and 60 are tightened onto the tractor axles 14 by nut and bolt assemblies 58, as indicated in FIGURE 8. The foregoing elements 54 through 60 will hereafter be termed "yokes."

Obtuse triangular panels 62 and 64 are secured by welding or the like to the outside lateral edges of auxiliary platforms 38 and 36. As indicated in FIGURE 1, the apex of these panels is positioned upwardly and rearwardly from the platform components. A rear panel 66 connects the rearward edges of panels 62 and 64. As indicated in FIGURE 3, angle 68 is riveted to the top edges of the vertical side panels 62 nd 64 to reinforce these edges.

The cab 70 has two opposite side panels 72 and 74 which are shaped at their bottoms to mount on panels 62 and 64, respectively, as will be described hereafter. Rear panel 76 (not shown) connects the rear edges of side panels 72 and 74 and is positioned to extend upwardly and slightly rearwardly so that light reflecting therefrom will be deflected into the ground. The front panel 78 connects the forward edges of side panels 72 and 74, and front panel 78 also extends upwardly and slightly forwardly to deflect light downwardly. The forward panel contains an opening 80 with a flexible material 82 secured therearound to permit the front panel to adapt to the arcuate shape of cowling 20. This forward panel includes transparent material throughout except for the angles on its periphery and the horizontal brace 84.

Roof 86 is secured to the rear, side and forward panels to completely enclose the cab 70. The upper portions of the side panels, and the rear panel should also be comprised of transparent material.

The side panels 72 and 74 have lower edges that extend upwardly and rearwardly so that these edges rest on the top edges of panels 62 and 64, the roof 86 of cab 70 will be substantially level. An outwardly and downwardly extending bracket 88 is riveted to the lower edges of sides panels 72 and 74 of cab 70 to receive the upwardly extending flange 90 of angle 68 on panels 62 and 64. This structure is shown in FIGURE 3, and creates both a stabilizing and moisture-proof connection between the cab and panels 62 and 64.

Bars 92 having elongated slots 94 are adjustably connected to the upper ends of the rear edges of panels 62 and 64 by bolts 96 and 98 which slidably extend through the slots into a threaded receptacle (not shown) on the panels. A U-shaped eyelet 100 extends rearwardly from each of the bars 92 at the upper ends thereof.

Bars 102 are similar to bars 92 and are adjustably secured to the lower rear edges of the side panels 72 and 74 of cab 70 by bolt 104 in the same manner that bars 92 were secured to panels 62 and 64. U-shaped hooks 106 are welded to and extend downwardly from the lower ends of bars 102, and are adapted to be detachably received in eyelets 100 at times.

The normal operation of our device is as follows: After the auxiliary platforms 36 and 38 have been installed in the manner indicated, the cab 70 is tilted to the position shown by the dotted lines in FIGURE 1 so that hooks 106 on the rear of the cam are inserted in eyelets 1000. The cab is then rotated upwardly and forwardly to the position shown by the solid lines in FIGURE 1. Because the pivot point of the cab is so far rearwardly and is in an elevated position, the forward panel 78 of the cab descends substantially vertically downwardly on the tractor and easily avoids the steering wheel 22, lights 24, etc. The cab 70 forms a seal with the side panels 62 and 64, as shown in FIGURE 3, which serves to keep the cab moisture-proof. The bars 92 and 102 can be adjusted to permit the pivotal connection of the cab to the panels 62 and 64 to be selectively adjusted. Since the cab-supporting panels 62 and 64 extend forwardly and downwardly from the point of pivotal connection with the cab, the weight of the cab better serves to maintain the cab's fixed position on the supporting structure.

The cab 70 can be removed from the tractor by merely reversing the above procedure. It is seen, therefore, that the cab 70 can be easily and quickly mounted on and dismounted from the tractor, and it is further seen that the objects of our invention are therefore achieved.

Some changes may be made in the construction and arrangement of our detachable tractor cab without departing from the real spirit and purpose of our invention, and it is our intention to cover by our claims, any modified forms of structure or use of mechanical equivalents which may be reasonably included within their scope.

We claim:

1. In combination,
a tractor having a frame and rearward and forward ends,
a horizontal platform surface on said frame,
first and second side panels secured to and extending upwardly from said platform having upper and lower edges, rearward and forward ends,
said first and second side panels each having pivotal connection means thereon at their upper rearward ends,
a cab mounted on said side panels and extending upwardly therefrom having at least third and fourth side panels engaging said first and second side panels and having top and bottom edges, and rearward and forward ends,
said cab having pivotal means secured thereto at the lower rearward ends of each said third and fourth side panels adapted to pivotally engage said pivotal connection means,
each of said first and second side panels extending forwardly and downwardly from their upper rearward ends.

2. In combination,
a tractor having a frame and rearward and forward ends,
a horizontal platform surface on said frame,
first and second side panels secured to and extending upwardly from said platform having upper and lower edges, rearward and forward ends,
said first and second side panels each having pivotal connection means thereon at their upper rearward ends,
a cab mounted on said side panels and extending upwardly therefrom having at least third and fourth side panels engaging said first and second side panels and having top and bottom edges, and rearward and forward ends,
said cab having pivotal means secured thereto at the lower rearward ends of each said third and fourth side panels adapted to pivotally engage said pivotal connection means,
each of said first and second side panels extending forwardly and downwardly from their upper rearward ends,
said cab being positioned on said first and second side panels so that said pivotal connection means are rearwardly of the rearward end of said cab.

3. In combination,
a tractor having a frame and rearward and forward ends,
a horizontal platform surface on said frame,
first and second side panels secured to and extending forwardly from said platform having upper and lower edges, rearward and forward ends,
said first and second side panels each having adjustable pivotal connection means thereon at their upper rearward ends,
a cab mounted on said side panels and extending upwardly therefrom having at least third and fourth side panels engaging said first and second side panels and having top and bottom edges, and rearward and forward ends,
said cab having adjustable pivotal means secured thereto at the lower rearward ends of each said third and fourth side panels adapted to pivotally engage said pivotal connection means,
each of said first and second side panels extending forwardly and downwardly from their upper rearward ends.

4. In combination,
a tractor having a frame and rearward and forward ends,
a horizontal platform surface on said frame,
first and second side panels secured to and extending upwardly from said platform having upper and lower edges, rearward and forward ends,
said first and second side panels each having pivotal connection means thereon at their upper rearward ends,
a cab mounted on said side panels and extending upwardly therefrom having at least third and fourth side panels engaging said first and second side panels and having top and bottom edges, and reaward and forward ends,
said cab having pivotal means secured thereto at the lower reaward ends of each said third and fourth side panels adapted to pivotally engage said pivotal connection means,
said cab being positioned on said first and second side panels so that said pivotal connection means are reawardly of the rearward end of said cab.

5. In combination,
a tractor having a frame and rearward and forward ends,
a horizontal platform surface on said frame,
first and second auxiliary platforms secured to said frame and positioned laterally of said platform section,
first and second side panels secured to and extending upwardly from said auxiliary platforms respectively and having upper and lower edges, rearward and forward ends,
said first and second side panels each having pivotal connection means thereon at their upper rearward ends,
a cab mounted on said first and second side panels extending upwardly therefrom and having at least third and fourth side panels engaging said first and second side panels respectively and having top and bottom edges, rearward and forward ends,
said cab having pivotal means secured thereto at the lower rearward ends of each of said third and fourth side panels adapted to pivotally engage said pivotal connection means,
each of said first and second side panels extending forwardly and downwardly from their upper rearward ends.

References Cited by the Examiner
UNITED STATES PATENTS

| | | | |
|---|---|---|---|
| 1,306,799 | 6/19 | Chambers | 292—256.75 |
| 2,525,217 | 10/50 | Glitsch | 292—256.73 |
| 2,565,919 | 8/51 | Hill | 296—102 |
| 2,584,329 | 2/52 | Clapper | 180—54 |
| 2,740,487 | 4/56 | Murty et al. | 180—69 X |
| 2,951,548 | 9/60 | Crockett et al. | 180—89 |
| 3,039,557 | 6/62 | Boyce et al. | 180—89 |

FOREIGN PATENTS

| | | |
|---|---|---|
| 354,424 | 8/31 | Great Britain. |

A. HARRY LEVY, *Primary Examiner.*

PHILIP ARNOLD, *Examiner.*